(12) United States Patent
Trainer et al.

(10) Patent No.: US 8,879,291 B2
(45) Date of Patent: Nov. 4, 2014

(54) MULTILEVEL VOLTAGE SOURCE CONVERTER

(75) Inventors: David Trainer, Alvaston (GB); Ruchira Withanage, Stafford (GB); Robert Whitehouse, Stafford (GB); Andrew Cross, Great Haywood (GB)

(73) Assignee: Alstom Technology Ltd., Baden (CH)

( * ) Notice: Subject to any disclaimer, the term of this patent is extended or adjusted under 35 U.S.C. 154(b) by 64 days.

(21) Appl. No.: 13/148,370

(22) PCT Filed: Feb. 9, 2009

(86) PCT No.: PCT/EP2009/051460
§ 371 (c)(1),
(2), (4) Date: Nov. 10, 2011

(87) PCT Pub. No.: WO2010/088969
PCT Pub. Date: Aug. 12, 2010

(65) Prior Publication Data
US 2012/0069610 A1 Mar. 22, 2012

(51) Int. Cl.
*H02M 7/217* (2006.01)
*H02M 7/49* (2007.01)
*H02M 7/797* (2006.01)
*H02M 1/00* (2006.01)
*H02M 7/483* (2007.01)

(52) U.S. Cl.
CPC ............ *H02M 7/797* (2013.01); *H02M 7/49* (2013.01); *Y02E 40/26* (2013.01); *H02M 2001/007* (2013.01); *H02M 2007/4835* (2013.01)
USPC ......................................... 363/127

(58) Field of Classification Search
CPC ................. H02M 7/49; H02M 7/797
USPC ......... 363/35–37, 97–98, 125–128, 131–132, 363/39, 40, 44; 323/222
See application file for complete search history.

(56) References Cited

U.S. PATENT DOCUMENTS

| | | | |
|---|---|---|---|
| 5,355,293 A * | 10/1994 | Carlstedt | 363/17 |
| 6,144,567 A | 11/2000 | Asplund et al. | |
| 6,246,594 B1 * | 6/2001 | Matsuda et al. | 363/17 |
| 6,249,444 B1 * | 6/2001 | Cross | 363/21.03 |

(Continued)

FOREIGN PATENT DOCUMENTS

| CN | 2058286 U | 6/1990 |
|---|---|---|
| CN | 201312267 Y | 9/2009 |

(Continued)

OTHER PUBLICATIONS

International Search Report issued on Jun. 4, 2009, in Patent Application No. PCT/EP2009/051460.
Yonghe H. Liu et al. "A New High-Pulse Voltage-Sourced Converter for HV DC Transmission", IEEE Transactions on Power Delivery, vol. 18, No. 4, XP 11103360, Oct. 1, 2003, pp. 1388-1393.

(Continued)

*Primary Examiner* — Matthew Nguyen
(74) *Attorney, Agent, or Firm* — Oblon, Spivak, McClelland, Maier & Neustadt, L.L.P.

(57) ABSTRACT

A multilevel voltage source converter for high voltage DC power transmission and reactive power compensation. The voltage source converter includes at least one phase element including a plurality of semiconductor switches to interconnect a DC voltage and an AC voltage. The voltage source converter also includes at least one auxiliary converter to act as a waveform synthesizer to modify the DC voltage presented to the DC side of the phase element.

32 Claims, 5 Drawing Sheets

(56) References Cited

U.S. PATENT DOCUMENTS

| | | | |
|---|---|---|---|
| 6,490,179 B1 * | 12/2002 | Boylan et al. | 363/21.06 |
| 6,885,568 B2 * | 4/2005 | Kernahan et al. | 363/97 |
| 7,440,301 B2 * | 10/2008 | Kirchmeier et al. | 363/132 |
| 7,564,700 B2 * | 7/2009 | Hansson et al. | 363/16 |
| 7,652,901 B2 * | 1/2010 | Kirchmeier et al. | 363/132 |
| 8,027,174 B2 * | 9/2011 | Ryu et al. | 363/16 |
| 8,035,995 B2 * | 10/2011 | Young et al. | 363/17 |
| 2003/0202367 A1 | 10/2003 | Schreiber | |
| 2008/0205093 A1 | 8/2008 | Davies et al. | |
| 2011/0236591 A1 * | 9/2011 | Madocks et al. | 427/523 |

FOREIGN PATENT DOCUMENTS

| | | |
|---|---|---|
| WO | WO 98/43336 A2 | 10/1998 |
| WO | WO 02/063758 A1 | 8/2002 |
| WO | WO 03/023933 A1 | 3/2003 |
| WO | WO 2007/028349 A1 | 3/2007 |
| WO | WO 2008/098812 A1 | 8/2008 |

OTHER PUBLICATIONS

N. R. Raju, "A DC Link-Modulated Three-Phase Converter", Conference Record of the 2001 IEEE Industry Applications Conference. $36^{th}$ IAS Annual Meeting, vol. 4, XP 10561989, Sep. 30, 2001, pp. 2181-2185.

Gui-Jia Su et al. "Multilevel DC Link Inverter for Brushless Permanent Magnet Motors with Very Low Inductance", Conference Record of the 2001 IEEE Industry Applications Conference. $36^{th}$ IAS Annual Meeting, vol. 2, XP 10561797, Sep. 30, 2001, pp. 829-834.

Combined Office Action and Search Report issued Sep. 18, 2013 in Chinese Patent Application No. 200980157689.6 (with English language translation).

Combined Chinese Office Action and Search Report issued Dec. 26, 2013 in Patent Application No. 200980160796.4 with English Translation.

Georgios S. Konstantinou et al., "Performance Evaluation of Half-Bridge Cascaded Multilevel Converters Operated with Multicarrier Sinusoidal PWM Techniques", $4^{th}$ IEEE Conference on industrial electronics and applications, 2009, pp. 3399-3404.

\* cited by examiner

MULTILEVEL VOLTAGE SOURCE CONVERTER

The invention relates to a multilevel voltage source converter for use in high voltage direct current (HVDC) power transmission and reactive power compensation.

In power transmission networks alternating current (AC) power is typically converted to direct current (DC) power for transmission via overhead lines and/or under-sea cables. This conversion removes the need to compensate for AC capacitive load effects imposed by the transmission line or cable and reduces the cost per kilometer of the lines and/or cables, and thus becomes cost-effective when power needs to be transmitted over a long distance.

The conversion of AC power to DC power is also utilized in power transmission networks where it is necessary to interconnect two AC networks operating at different frequencies.

In any such power transmission network, converters are required at each interface between AC and DC power to effect the required conversion, and one such form of converter is a voltage source converter. Voltage source converters are desirable for use in HVDC power transmission networks as a result of their controllability, flexibility and their generally compact and modular design.

AC networks require a supply of reactive power to accommodate the requirements of the connected electrical equipment and to provide network voltage control, particularly during faults and disturbances. It is beneficial therefore if voltage source converters primarily designed for real power transmission can also provide reactive power to the AC network.

Control of the reactive power provided by a voltage source converter requires a change in the magnitude of the voltage produced on the AC side of the converter. Conventionally this is practically achieved by increasing or decreasing the voltage on the DC side of the converter to produce leading or lagging reactive power respectively. However in an HVDC power transmission scheme interconnecting two AC networks, it is desirable to change the flow of reactive power independently at each AC network whilst keeping the DC voltage near constant.

It has therefore become desirable to provide a voltage source converter that is able to generate or absorb reactive power from an AC network, as required, whilst maintaining a constant DC network voltage.

Figure 1A:
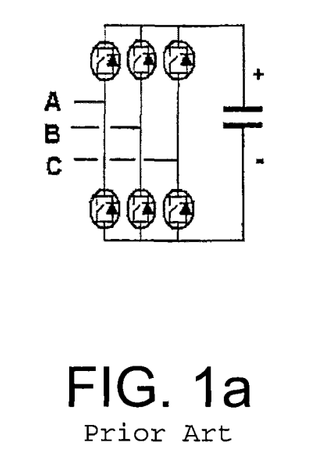
FIGS. 1a and 1b show, in schematic, prior art voltage source converters for HVDC power transmission with the ability to generate or absorb reactive power from an AC network.
Figure 1B:
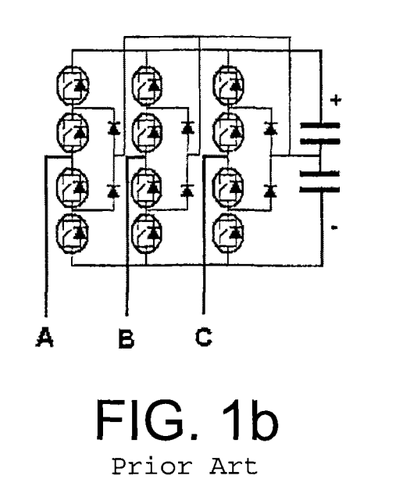

One possible solution is shown schematically in FIGS. 1a and 1b and employs both conventional 6-switch (2-level) and 3-level multilevel converter topologies, with insulated gate bipolar transistors (IGBT) connected and switched together in series to enable high power ratings of 10's-100's of MW to be realized.

This solution however requires a complex and active IGBT gate drive and large passive snubber components to ensure that the high voltage across the series strings of IGBT devices shares properly during converter switching. In addition, the IGBT devices need to switch on and off several times (at high voltage) over each cycle of the AC frequency to control the harmonic currents being fed to the AC network.

These factors lead to high losses, high levels of electromagnetic interference and a complex design.

Figure 2:
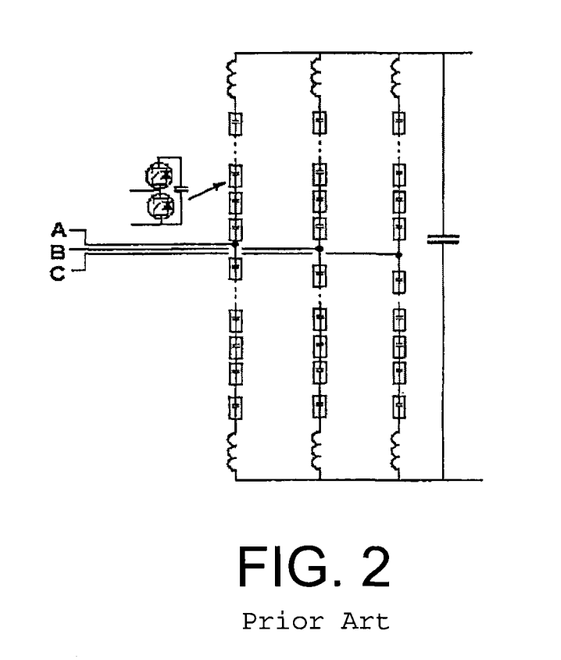
FIG. 2 shows, in schematic, another prior art voltage source converter for HVDC power transmission with the ability to generate or absorb reactive power from an AC network.

Another possible solution is shown schematically in FIG. 2 and employs simple converter bridges or cells connected in series, with each cell being switched at a different time.

This solution eliminates many of the problems associated with the direct switching of series connected IGBT devices because the individual bridge cells do not switch simultaneously, and the converter voltage steps are relatively small.

However each cell requires a large DC link capacitor rated to carry fundamental frequency and direct current components. Also six DC side reactors are required to enable the parallel connection and operation of converter limbs, which are primarily used to limit transient current flow between capacitive converter limbs.

These factors lead to expensive, large and heavy equipment with significant amounts of stored energy. They therefore render pre-assembly, testing and transportation to site difficult.

In addition, the use of a large number of individually controlled cells means that a high number of fibre-optic communication channels are required between ground level control and the high voltage converter. This is complex, expensive and requires sophisticated designs and very fast and accurate processing.

According to an aspect of the invention, there is provided a multilevel voltage source converter for high voltage DC power transmission and reactive power compensation, the voltage source converter comprising at least one phase element including a plurality of semiconductor switches to interconnect a DC network and an AC network, and at least one auxiliary converter to act as a waveform synthesizer to modify the DC voltage presented to the DC side of the phase element.

The provision of an auxiliary converter allows shaping of the DC voltage for transfer to the AC side. In the absence of the one or more auxiliary converters to modify the DC voltage presented to the DC side of the or each phase element, the constant DC side voltage would produce a square wave voltage on the AC side of the or each phase element, with significant harmonic components and hard switching of the semiconductor devices. The provision of the one or more auxiliary converters however allows the production of a more desirable AC waveform with less harmonic distortion.

Preferably the or each phase element includes four semiconductor switches that are each controlled to switch on and off a minimum number of times in normal operation and most preferably only once every cycle of the AC frequency.

The synchronized switching of these main converter elements allows the use of block switching techniques in which fewer fibre-optic communication channels are required between ground level control and the high voltage converter equipment.

The semiconductor switches are preferably constructed from series connected insulated-gate bipolar transistors. However, in other embodiments, the switches may be constructed from gate turn-off thyristors or field-effect transistors.

Preferably the or each auxiliary converter synthesizes a waveform closely approximating an offset rectified sinusoid, or other preferred waveform, for presentation to the DC side of the or each phase element.

The synthesis of a waveform closely approximating a rectified sinusoid results in the creation of a near-perfect sinewave, with minimal harmonic distortion, on the AC side of the or each phase element. This means the converter does not require harmonic filters on the AC side of the converter to control power quality.

It also allows the semiconductor switches to be switched at near zero voltage, otherwise known as soft switching, and therefore minimizes switching losses in normal operation of the converter.

The or each auxiliary converter preferably includes a single-phase multilevel converter to function as a high precision waveform synthesizer. The single-phase multilevel converter is preferably a chain-link type converter. However, in other embodiments, the single-phase multilevel converter may be a diode clamped converter or a flying capacitor converter.

The use of a chain-link type converter allows the use of a converter that is unidirectional (i.e. produces voltage steps in one polarity only) or bidirectional (i.e. produces voltage steps in both positive and negative polarities).

In order to provide a unidirectional single-phase multilevel converter, the chain-link type converter may include a chain of modules connected in series, each module including a pair of semiconductor switches and a capacitor connected in parallel in a half-bridge arrangement to define a 2-quadrant unipolar module that can develop zero or positive voltage.

In order to provide a bidirectional single-phase multilevel converter, the chain-link type converter may include a chain of modules connected in series, each module including two pairs of semiconductor switches and a capacitor connected in parallel in a full-bridge arrangement to define a 4-quadrant bipolar module that can develop positive or negative voltage.

In embodiments employing the use of one or more bidirectional single-phase multilevel converters, the chain-link converter preferably includes an energy source to bias the converter. The energy source may, for example, be provided in the form of a battery, a fuel cell or a charged capacitor.

According to another aspect of the invention there is provided a method of controlling a voltage source converter having at least one phase element including a plurality of semiconductor switches to interconnect a DC voltage and an AC voltage comprising the steps of:
  (i) modifying the DC voltage presented to the DC side of the or each phase element; and
  (ii) controlling the semiconductor switches of the or each phase element to switch on and off in sequence in order to convert the modified DC voltage presented to the DC side of the phase element to an AC voltage.

In embodiments where the converter is a multiphase converter including a plurality of phase elements, the same modified DC voltage may be presented to the DC side of each of the phase elements.

In other embodiments where the converter is a multiphase converter including a plurality of phase elements, the DC voltage presented to the DC side of each of the phase elements may be modified individually.

Preferably the method includes the step of injecting a triplen harmonic voltage into the DC voltage for presentation to the DC side of the or at least one phase element to produce a compensatory DC voltage to compensate for changes in the real power and/or reactive power requirements on the AC side of the phase element.

In such embodiments, a rectified zero-phase sequence triplen harmonic may be injected to produce a negative compensatory DC voltage component to compensate for an increase in the DC voltage required to generate reactive power of the AC side of the phase element.

In other such embodiments, a rectified, zero-phase triplen harmonic may be injected to produce a positive compensatory DC voltage component to compensate for a decrease in the DC voltage required to absorb reactive power from the AC side of the phase element.

The DC voltage presented to the DC side of the or at least one phase element may be modified to construct either a fundamental or a harmonic voltage to be passed to the AC side of the phase element.

Preferably average and alternating components of the DC voltage presented to the DC side of the or at least one phase element are modified to affect the summed DC output voltage whilst simultaneously maintaining control of the voltage appearing on the AC side of the phase element.

This allows the DC voltage presented to the of each phase element to be controlled in accordance with the magnitude and ripple of AC components on the AC side of the phase element.

In order to minimize the voltage of the or each phase element at the instant of switching, in the event of a fault for example, the DC voltage presented to the DC side of the or at least one phase element may be temporarily modified.

Other advantageous features of the invention are recited in dependent claims 14 to 21, 23, 24 and 25 appended hereto.

Preferred embodiments of the invention will now be described by way of non-limiting examples with reference to the accompanying drawings in which.

Figure 3:
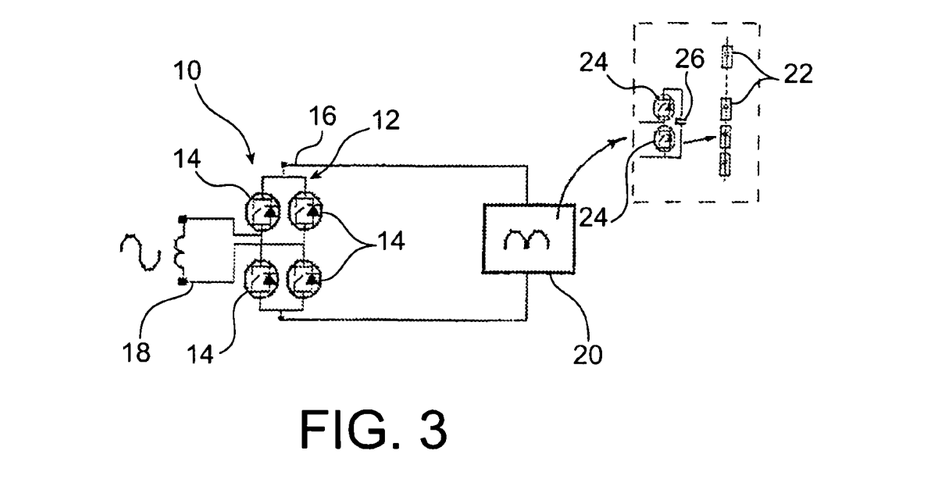
FIG. 3 shows a single phase multilevel voltage source converter according to a first embodiment of the invention.

A single phase multilevel voltage source converter 10 according to a first embodiment of the invention is shown in FIG. 3.

The single phase converter 10 includes a phase element 12 including four semiconductor switches 14 to interconnect a DC network and an AC network. The converter 10 also includes an auxiliary converter 20 to act as a waveform synthesizer to modify the DC voltage presented to the DC side of the phase element 12.

The semiconductor switches 14 are controlled to switch on and off once every cycle of the frequency of the AC network, which is typically 50 Hz or 60 Hz, and are constructed from series connected insulated-gate bipolar transistors.

In other embodiments it is envisaged that the semiconductor switches 14 may be constructed from other similar devices such as, for example, gate turn-off thyristors or field-effect transistors.

The synchronized switching of the semiconductor switches 14 allows the use of block switching techniques and thereby allows the number of fibre-optic communication channels between the ground level control and the high voltage converter equipment to be minimized.

The auxiliary converter 20 modifies the DC voltage to synthesize a waveform closely approximating a rectified sinusoid for presentation to the DC side 16 of the phase element 12. This results in the production of a near-perfect sine-wave, with minimal harmonic distortion, on the AC side 18 of the phase element 12. The converter 10 does not therefore require harmonic filters on the AC side of the converter 10 to control power quality.

This also allows the semiconductor switches 14 to be switched at near zero voltage and therefore results in almost zero switching losses during normal operation of the converter 10.

It is envisaged that in other embodiments, the auxiliary converter 20 may modify the DC voltage to synthesize other waveforms in order to produce other ripple components or minimize the magnitude of the ripple voltage on the AC side 18 of the phase element.

The use of the auxiliary converter 20 means that the voltage profile presented to the string of insulated-gate bipolar transistors is imposed and controlled by the auxiliary converter 20 and is a slowly changing waveform rather than the high voltage steps that would otherwise be presented to the semiconductor switches 14. It therefore removes the need for complex active gate drives and large voltage sharing components within the main converter design and instead results in simpler, less expensive and more efficient hardware.

In addition, the use of the auxiliary converter 20 enables the voltage imposed on the semiconductor switches 14 to be rapidly ramped to zero (or minimum value) when required during fault conditions to facilitate soft switching at reduced voltage.

In order to compensate for changes in the real power and/or reactive power requirements on the AC side 18 of the phase element 12, the auxiliary converter 20 is preferably operable to inject a triplen harmonic voltage into the DC voltage for presentation to the DC side 16 of the phase element 12. This results in the production of a compensatory DC voltage to compensate for the resultant change in the DC voltage on the DC side 16 of the phase element 12.

For example, in circumstances where it becomes necessary to generate reactive power on the AC side 18 of the phase element 12, the auxiliary converter 20 is operable to inject a rectified, zero-phase sequence triplen harmonic into the DC voltage for presentation to the DC side 16 of the phase element 12. This results in the production of a negative compensatory DC voltage component to compensate for the resultant increase in the DC voltage on the DC side 16 of the phase element 12.

In circumstances where it becomes necessary to absorb reactive power from the AC side 18 of the phase 12, the auxiliary converter 20 is operable to inject a rectified, zero-phase sequence triplen harmonic into the DC voltage for presentation to the DC side 16 of the phase element 12. This results in the production of a positive compensatory DC voltage component to compensate for the resultant decrease in the DC voltage on the DC side 16 of the phase element 12.

By controlling the auxiliary converter 20, it is possible to produce a compensatory DC voltage component appearing on the DC side 16 of the phase element 12 so as to ensure that the net increase or decrease in DC voltage is controlled to be zero whilst the AC voltage can be made to vary in order to allow reactive power control.

Preferably the auxiliary converter 20 injects zero-phase sequence, $3^{rd}$ harmonics into the DC voltage for presentation to the DC side 16 of the phase element 12.

Zero-phase sequence, $3^{rd}$ harmonic components are not seen in the primary line to neutral voltage waveforms or in the primary or secondary side current waveforms. Other triplen waveforms (e.g. $9^{th}$, $15^{th}$ $21^{st}$, etc.) may also be applied with similar effects.

Operation of the auxiliary converter 20 to inject a triplen harmonic into the DC voltage for presentation to the DC side 16 of the phase element 12 may also be used to increase the AC voltage on the AC side 18 of the phase element 12 in circumstances where the reactive power requirement is small or not needed.

This reduces the current drawn by the converter 10 for a given power transfer in both rectified and inverter operating modes. This is beneficial because lower levels of current flow reduce power losses that would otherwise occur in converter equipment. It may also reduce the ripple current components in any capacitors (not shown) connected to the DC side 16 of the phase element 12, thereby reducing capacitance requirements and associated power losses.

In the embodiment shown in FIG. 3, the auxiliary converter 20 is a chain-link type converter including a chain of modules 22 connected in series. Each of the modules 22 includes a pair of semiconductor switches 24 in the form of insulated-gate bipolar transistors and a capacitor 26 connected in parallel in a half-bridge arrangement to define a 2-quadrant unipolar module.

Each of the modules 22 can develop zero or positive voltage and allows the auxiliary converter 20 to produce voltage steps in one polarity only.

In other embodiments, where it is desirable for the auxiliary converter 20 to produce voltage steps in both positive and negative polarities, the modules 22 of the auxiliary converter 20 may be provided in the form of bipolar modules. One such embodiment is shown in FIG. 4.

Figure 4:
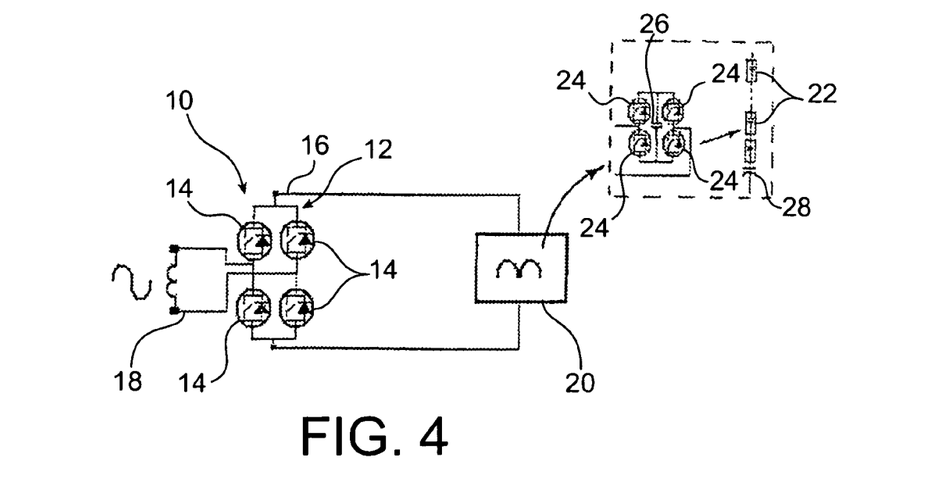
FIG. 4 shows a single phase multilevel voltage source converter according to a second embodiment of the invention.

In the embodiment shown in FIG. 4, the auxiliary converter 20 is again a chain-link type converter including a chain of modules 22 connected in series. However each of the modules 22 includes two pairs of semiconductor switches 24 and a capacitor 26 connected in parallel in a full-bridge arrangement to define a 4-quadrant bipolar module that can develop positive or negative voltage.

The use of an auxiliary converter 20 constructed from a chain of modules 22 permits modification of the DC voltage presented to the DC side of the phase element 12 so as to track complex waveforms. It therefore provides an active filtering capability because it allows both fundamental and harmonic voltages to be constructed on the DC side 16 of the phase element 12 and passed to the AC side 18 of the phase element 12 on a single phase basis.

The use of an auxiliary converter 20 constructed from a chain of modules 22 also permits a rapid reduction in the voltage on the AC side 18 of the phase element 12 in the event of both local and remote fault conditions by simply using fewer cells to construct the output waveform presented to the DC side 16 of the phase element 12.

The auxiliary converter 20 also includes an energy source in the form of a capacitor 28 to bias the auxiliary converter 20. In other embodiments, the capacitor 28 may be placed by a fuel cell or a battery.

To enable either of the converters 10 shown in FIGS. 3 and 4 to handle a fault condition, where insulated-gate bipolar transistor switching at high voltage is required, it is envisaged that each of the converters 10 may include a single-shot voltage control element such as, for example, a traditional voltage suppression device of zinc oxide, which would safely limit the voltage applied to each semiconductor switch 14.

Figure 5:
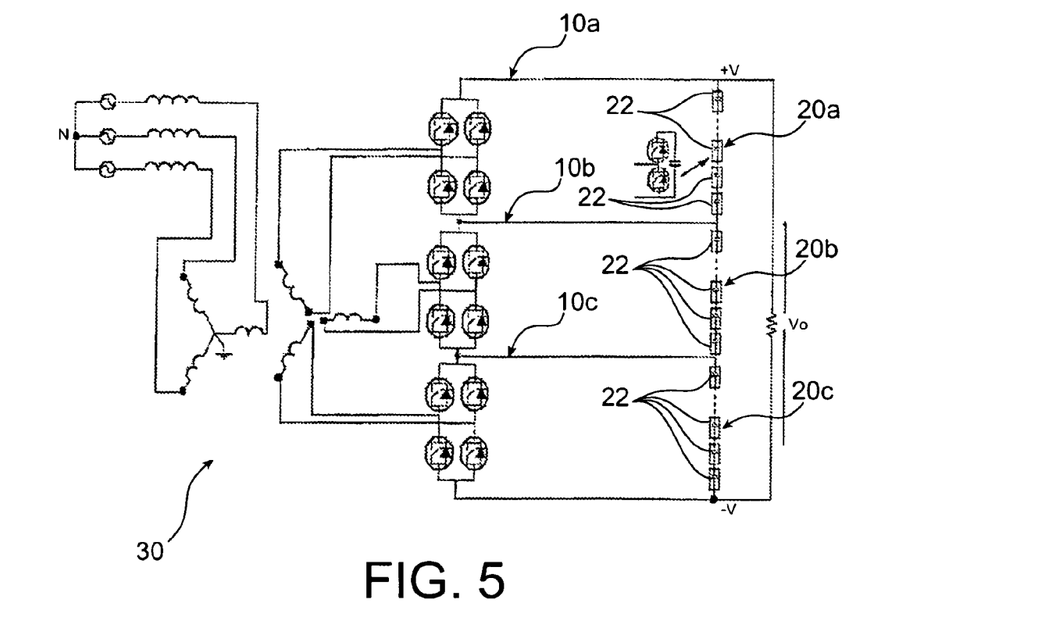
FIG. 5 shows a three phase multilevel voltage source converter according to a third embodiment of the invention.

A three phase multilevel voltage source converter 30 according to a third embodiment of the invention is shown in FIG. 5.

The three phase multilevel converter 30 includes three single phase converters 10a,10b,10c connected in series to form a two terminal DC network for electrical transmission.

The structure and function of each of the single phase converters 10a,10b,10c of the three phase converter 30 is the same as that of the single phase converter 10 shown in FIG. 3, the auxiliary converter 20a,20b,20c of each of the single phase converters 10a,10b,10c including half-bridge, unipolar modules 22.

Figure 6:
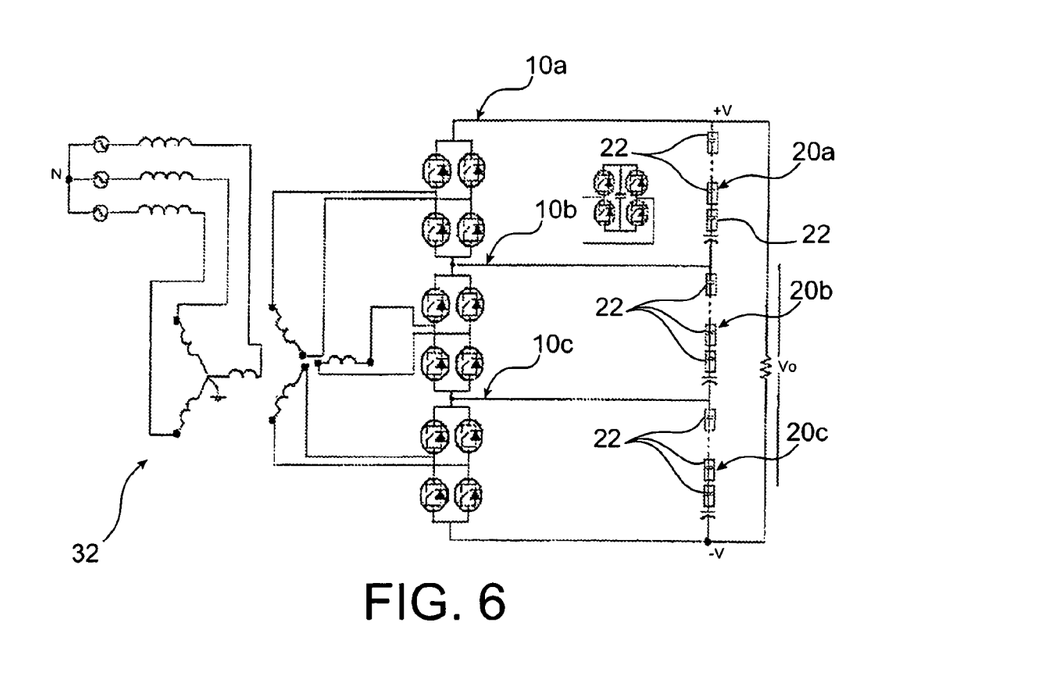
FIG. 6 shows a three phase multilevel voltage source converter according to a fourth embodiment of the invention.

Another three phase multilevel converter 32 including three single phase converters 10a,10b,10c connected in series is shown in FIG. 6.

The structure and function of each of the single phase converters 10a,10b,10c is the same as that of the single phase converter 10 shown in FIG. 4, the auxiliary converter 20 of each of the single phase converters 10a,10b,10c including full-bridge, bipolar modules 22.

In each of the embodiments shown in FIGS. 5 and 6, the auxiliary converters 20a,20b,20c operate independently and 120 electrical degrees part from each other.

In use, the DC output voltage in each of the embodiments shown in FIGS. 5 and 6 is the sum of the individual synthesized waveforms operating 120 electrical degrees apart. In normal operation these sum to a $6^{th}$ harmonic ripple voltage at the output of each of the converters 30,32.

As outlined above, it is envisaged that in other embodiments other waveforms may be synthesized to produce other ripple components or minimize the magnitude of the ripple voltage at the output of each of the converters 30,32.

Each of the converters 30,32 can be considered to produce one "pole" of a DC transmission scheme. Bi-pole schemes may be constructed by connecting two such poles in series on the DC side of the installation.

An additional phase shift of 30 electrical degrees may be introduced by the transformer connection by either configuring a 3-phase star winding into delta (which may be practical on the primary side) or introducing a more complex interconnected star (or zig-zag) secondary. This has the advantage that the DC output ripple is reduced in magnitude and becomes a $12^{th}$ harmonic waveform.

The DC capacitors 26a, 26b, 26c, 28a,28b,28c (all capacitors within the chain modules) of the auxiliary converters 20a,20b,20c of the converters 30,32 shown in FIGS. 5 and 6 conduct $2^{nd}$ harmonic current components rather than the fundamental current components experienced by the multi-level converter prior art arrangement shown in FIG. 2. Therefore, for the same current rating, the capacitance required to control ripple voltage excursion is about half the value.

In addition, significantly fewer modules 22 are required in each of the auxiliary converters 20a,20b,20c of the converters 30,32 shown in FIGS. 5 and 6 than are required in the prior art arrangement shown in FIG. 2.

Since the converters 30,32 shown in FIGS. 5 and 6 operate in all four quadrants by controlling the phase angle and magnitude of the AC side converter generated voltage, it may be controlled to act as a rectifier, inverter and to absorb or generate reactive power.

Figure 7:
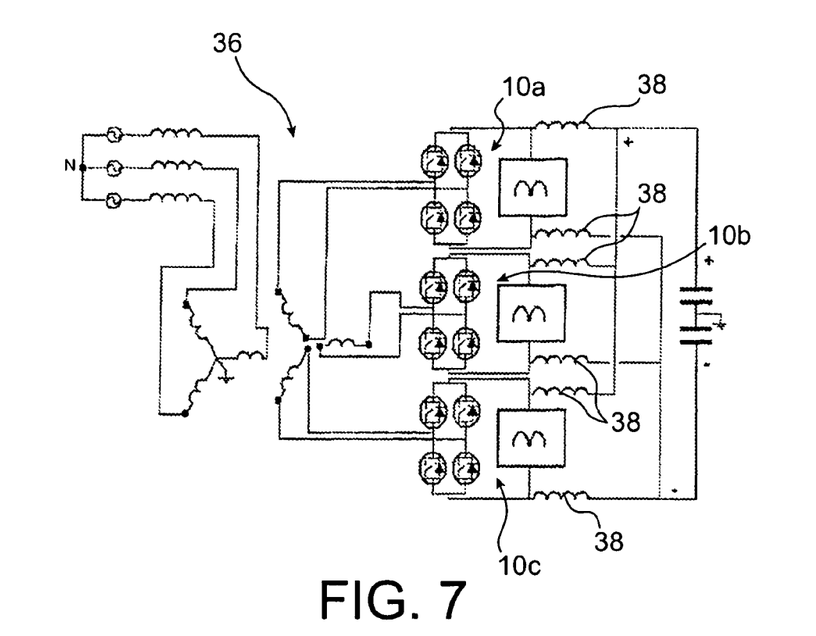
FIG. 7 shows a three phase multilevel voltage source converter according to a fifth embodiment of the invention.

In another embodiment, such as the fifth embodiment shown in FIG. 7, three single phase converters 10a,10b,10c may be connected in parallel to form a three phase converter 36.

The single phase converters 10a,10b,10c may be provided in the form shown in either of FIGS. 3 and 4.

To minimize dynamic interactions, buffer reactors 38 are connected between each of the single phase converters 10a, 10b,10c and its neighbours.

Figure 8:
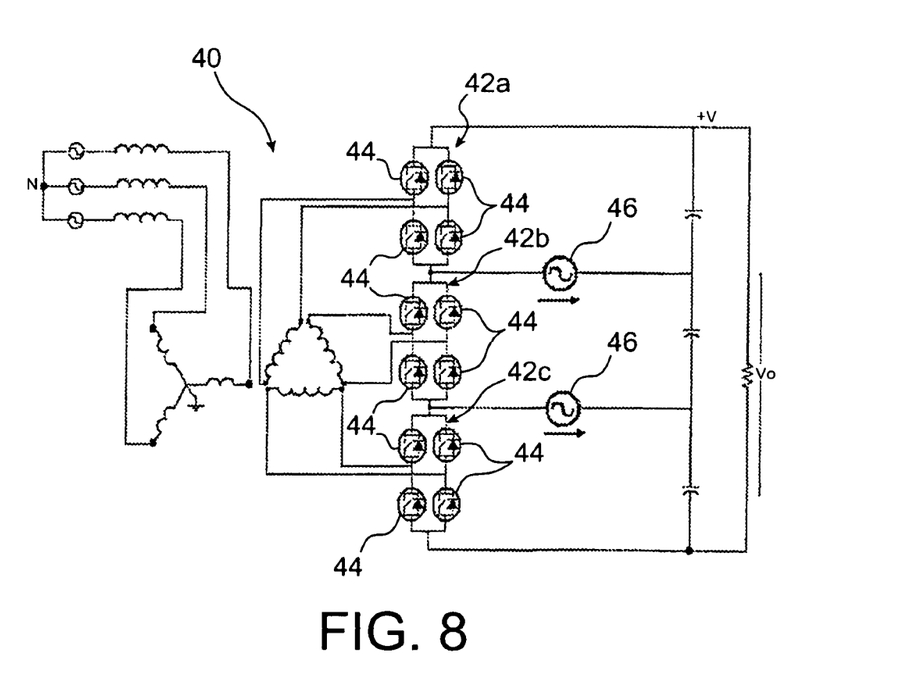
FIG. 8 shows a three phase multilevel voltage source converter according to a sixth embodiment of the invention.

A three phase multilevel converter 40 according to a sixth embodiment of the invention is shown in FIG. 8, and includes three phase elements 42a,42b,42c connected in series.

Each of the phase elements 42a,42b,42c includes four semiconductor switches 44 in the form of insulated-gate bipolar transistors that are controlled to switch on and off once every cycle of the frequency of the AC network.

An auxiliary converter 46 is connected to each of the mid-point connections between the phase elements 42a,42b,42c, thereby resulting in the provision of two auxiliary converters 46 compared with the three provided in each of the embodiments shown in FIGS. 5, 6 and 7.

Each of the auxiliary converters 46 is designed to produce an alternating voltage waveform and is constructed from 4-quadrant bipolar modules 22 shown in FIG. 4

The auxiliary converters 46 generate $2^{nd}$ harmonic sinusoidal waveforms, which alter the DC side waveform applied to each phase element 42a, 42b, 42c such that each becomes the sum of the constant voltage present at the DC side capacitor plus the alternating voltage (or voltages) produced by the auxiliary converter 46. The voltage waveforms produced by the two auxiliary converters 46 are suitably phase shifted to produce a symmetrical effect on all three AC side waveforms.

To enable the two auxiliary converters 46 to have the same effect on all three AC side waveforms, there are some inherent restrictions on the possible waveforms generated by the auxiliary converters 46 and the harmonic content of the waveforms appearing on the AC side.

Figure 9:
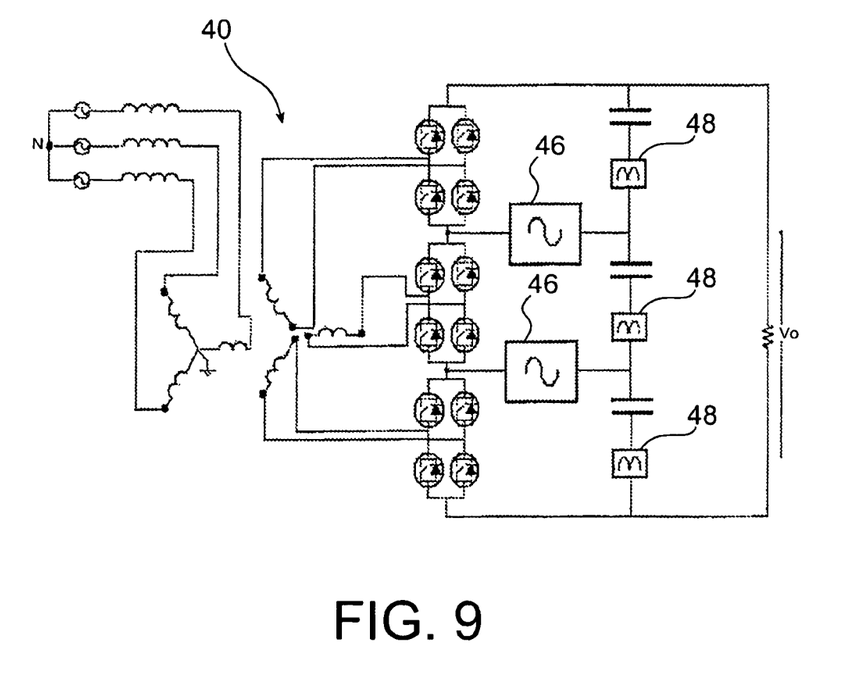
FIG. 9 shows a three phase multilevel voltage source converter according to a seventh embodiment of the invention.

In a seventh embodiment, the converter 40 shown in FIG. 8 is modified to include three additional low powered "fill in" auxiliary converters 48.

The provision of the "fill-in" auxiliary converters 48 ensures that each phase of the AC side receives the desired voltage waveform, and thereby permits the creation of a symmetrical and balanced 3-phase converter voltage waveform on the AC side of the converter 40.

This is achieved by removing the restrictions inherent in the arrangement shown in FIG. 8 by providing a third variable voltage source using the "fill-in" auxiliary converters 48 such that when this is combined with each DC capacitor voltage and voltage(s) generated by the auxiliary converter(s) 46, the summed DC side voltage and therefore the AC side voltage are improved.

The "fill-in" auxiliary converters produce higher harmonic voltage waveforms, such as the $4^{th}$, $6^{th}$ etc. to complement the $2^{nd}$ harmonic delivered from the mid-point auxiliary converters 46.

In order to control the DC output voltage in relation to magnitude and ripple components in the AC network in each of the converters 30,32,36,40,42 shown in FIGS. 5 to 9, the offset waveforms produced by the auxiliary converters may be changed so that when summed the DC output voltage of each of the converters becomes the desired waveform required to match both the AC network and DC network.

For example, average and alternating components of the waveform produced by at least one of the auxiliary converters may be modified to affect the DC output voltage.

Controlling the auxiliary converters in this manner allows the auxiliary converters to act as DC active filters.

The invention claimed is:

1. A multilevel voltage source converter for high voltage DC power transmission and reactive power compensation, the voltage source converter comprising:
    at least one phase element including a plurality of semiconductor switches to interconnect a DC voltage and an AC voltage; and
    at least one auxiliary converter to act as a waveform synthesizer to modify the DC voltage presented to a DC side of the phase element,
    wherein the at least one auxiliary converter applies a waveform to the DC side of the at least one phase element, the waveform approximating an offset rectified sinusoid waveform.

2. The multilevel voltage source converter according to claim 1, wherein the at least one phase element includes four semiconductor switches that are each controlled to switch on and off a minimum number of times in normal operation.

3. The multilevel voltage source converter according to claim 1, wherein the switches are constructed from series connected insulated-gate bipolar transistors.

4. The multilevel voltage source converter according to claim 1, wherein the switches are constructed from gate turn-off thyristors or field-effect transistors.

5. The multilevel voltage source converter according to claim 1, wherein the at least one auxiliary converter includes a single-phase multilevel converter.

6. The multilevel voltage source converter according to claim 5, wherein the single-phase multilevel converter is a chain-link type converter.

7. The multilevel voltage source converter according to claim 5, wherein the single-phase multilevel converter is a diode clamped converter or a flying capacitor converter.

8. The multilevel voltage source converter according to claim 6, wherein the chain-link converter includes a chain of modules connected in series, each module including a pair of semiconductor switches and a capacitor connected in parallel in a half-bridge arrangement to define a 2-quadrant unipolar module that can develop zero or positive voltage.

9. The multilevel voltage source converter according to claim 6, wherein the chain-link converter includes a chain of modules connected in series, each module including two pairs of semiconductor switches and a capacitor connected in parallel in a full-bridge arrangement to define a 4-quadrant bipolar module that can develop positive or negative voltage.

10. The multilevel voltage source converter according to claim 9, wherein the chain-link converter includes an energy source to bias the converter.

11. The multilevel voltage source converter according to claim 10, wherein the energy source is a battery, a fuel cell or a charged capacitor.

12. The multilevel voltage source converter according to claim 1, wherein an auxiliary converter of the at least one auxiliary converter is connected in parallel with a phase element of the at least one phase element, the at least one phase element and the respective at least one auxiliary converter forming a single phase converter limb.

13. The multilevel voltage source converter according to claim 12, wherein three single phase converter limbs are connected in series to define a two terminal DC network for three-phase electrical power transmission.

14. The multilevel voltage source converter according to claim 12, wherein three single phase converter limbs are connected in parallel to define a two terminal DC network for three-phase electrical power transmission.

15. The multilevel voltage source converter according to claim 14, further including buffer reactors interconnected between each limb and a neighbouring limb.

16. The multilevel voltage source converter according to claim 1, wherein three phase elements are connected in series and an auxiliary converter is connected to mid-point connection points between the phase elements to introduce $2^{nd}$ harmonic sinusoidal waveforms to a DC side of the phase elements.

17. The multilevel voltage source converter according to claim 16, further including three additional, low-powered, fill-in converters connected in series between the DC voltage and the auxiliary converters, each of the auxiliary converters being connected to a mid-point connection point between the fill-in converters to introduce higher harmonic voltage waveforms to the DC side of the phase elements.

18. The multilevel voltage source converter according to claim 17, further including an energy storage device associated with each fill-in converter.

19. The multilevel voltage source converter according to claim 18, wherein the energy storage device includes a DC capacitor, a battery or a fuel cell.

20. A method of controlling the multilevel voltage source converter of claim 1, comprising:
  (i) modifying the DC voltage presented to the DC side of the at least one phase element by applying a waveform to the DC side of the at least one phase element, the waveform approximating an offset rectified sinusoid, wherein the switches of the at least one phase element are controlled to switch on and off at zero voltage; and
  (ii) controlling the semiconductor switches of the at least one phase element to switch on and off in sequence in order to convert the modified DC voltage presented to the DC side of the at least one phase element to an AC voltage.

21. The method according to claim 20 wherein the semiconductor switches of the at least one phase element are controlled to switch on and off once every cycle of the AC frequency.

22. The method according to claim 20, wherein the converter is a multiphase converter including a plurality of phase elements and the same modified DC voltage is presented to the DC side of each of the phase elements.

23. The method according to claim 20, wherein the converter is a multiphase converter including a plurality of phase elements and the DC voltage presented to the DC side of each of the phase elements is modified individually.

24. The method according to claim 20, further comprising injecting a triplen harmonic voltage into the DC voltage for presentation to the DC side of the or at least one phase element to produce a compensatory DC voltage to compensate for changes in the real power and/or reactive power requirements on an AC side of the phase element.

25. The method according to claim 24, wherein a rectified, zero-phase sequence triplen harmonic is injected to produce a negative compensatory DC voltage component to compensate for an increase in the DC voltage required to generate reactive power on the AC side of the phase element.

26. The method according to claim 24, wherein a rectified, zero-phase triplen harmonic is injected to produce a positive compensatory DC voltage component to compensate for a decrease in the DC voltage required to absorb reactive power from the AC side of the phase element.

27. The method according to claim 20, wherein the DC voltage presented to the DC side of the at least one phase element is modified to construct a fundamental frequency voltage to be passed to an AC side of the phase element.

28. The method according to claim 20, wherein the DC voltage presented to the DC side of the at least one phase element is modified to construct a harmonic frequency voltage to be passed to an AC side of the phase element.

29. The method according to claim 20, wherein average and alternating components of the DC voltage presented to the DC side of the at least one phase element are modified to affect the summed DC output voltage whilst maintaining control of the voltage appearing at an AC side of the phase element.

30. The method according to claim 20, wherein the DC voltage presented to the DC side of the or at least one phase element is temporarily modified to minimize the voltage of the phase element at the instant of switching.

31. The multilevel voltage source converter according to claim 1, wherein the waveform includes a triplen harmonic.

32. The method according to claim 20, wherein the waveform includes a triplen harmonic.

* * * * *